March 3, 1953     N. LANGER     2,630,396
HEAT SEALING METHOD
Filed Jan. 18, 1949
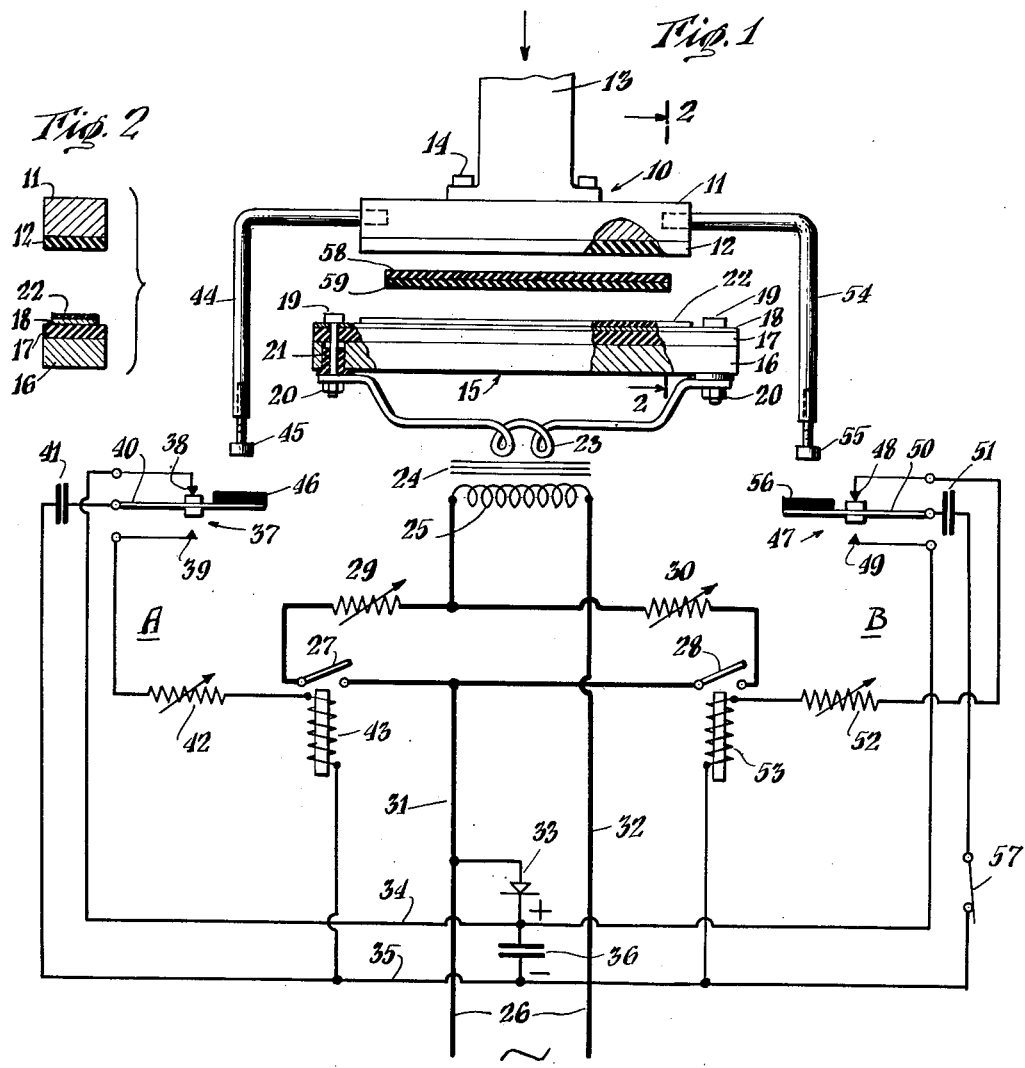
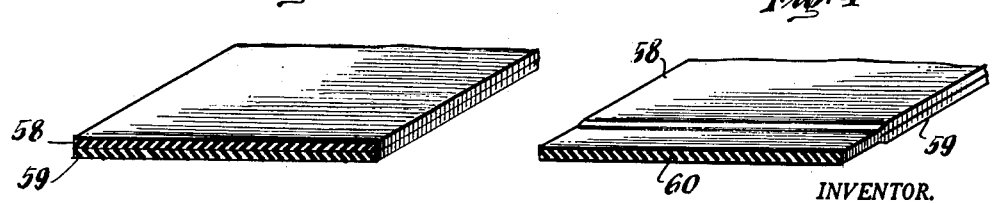
INVENTOR.
Nicholas Langer Patented Mar. 3, 1953

2,630,396

UNITED STATES PATENT OFFICE 2,630,396

HEAT SEALING METHOD

Nicholas Langer, New York, N. Y.

Application January 18, 1949, Serial No. 71,421

6 Claims. (Cl. 154—126)

This invention relates to the art of heatsealing, and more particularly, to an improved method of heatsealing thermoplastic sheet materials and to a machine for carrying such method into practice.

In my co-pending application Serial No. 572,882, filed January 15, 1945, now Patent No. 2,460,460, granted February 1, 1949, I have disclosed and claimed a machine and method for heatsealing thermoplastic sheet materials characterized by the compression of the region of the sheets to be heatsealed between two surfaces, at least one of which is constituted by an electrically conducting layer. An electric current is then passed through said conducting layer for a predetermined period to increase its temperature, the resulting heat being transferred by surface contact to the said region of the sheets causing heatsealing thereof. Compression is maintained upon said region after termination of said period until said conducting layer has cooled and the weld formed in the heatsealing region has cooled and consolidated and then the compression is terminated.

It is an object of the present invention to improve heatsealing machines of the described character.

It is another object of the present invention to provide an improved method of heatsealing thermoplastic sheet materials which is particularly suitable for heatsealing unlaminated sheets formed of rubber hydro-chloride, of a copolymer of vinyl chloride and vinyl acetate, of polyethylene and of vinylidene chloride.

Other and further objects and advantages of the present invention will become apparent from the following description.

The present application is a continuation-in-part of my aforesaid copending application Serial No. 572,882.

In the drawings:

Figure 1 is a diagrammatic view, somewhat fragmentary in character, of a heatsealing machine embodying the invention and suitable for carrying the method of the invention into practice;

Figure 2 is a section taken on line 2—2 of Figure 1;

Figure 3 is a perspective view of a pair of sheets of thermoplastic material before the heatsealing operation; and Figure 4 is a similar view of the sheets shown in Figure 3 after the heatsealing operation, providing a heatsealed bond between certain regions of the sheets.

Present trends in the packaging art are increasingly in the direction of employing thermoplastic sheet materials which are used without being laminated with non-fusible backing layers of paper, regenerated cellulose, and the like. This is due to the fact that with the gradual decrease in the cost of thermoplastic resins, the cost of laminating a thermoplastic sheet with a suitable backing material greatly exceeds the cost of providing a thermoplastic sheet having slightly heavier gauge to compensate for the loss of strength due to the absence of a separate backing layer. Also, in general, better decorative effects are obtainable by utilizing the attractive appearance, transparency or translucency of certain thermoplastic sheets which are now readily available on the market at a low cost.

This trend was greatly handicapped by the difficulty of satisfactorily heatsealing thermoplastic sheet materials with conventional heatsealing machines employing continuously heated sealing bars. In the absence of a non-fusible backing layer, the hot sealing bars are in direct pressure contact with the thermoplastic sheets which have a strong tendency to stick to the bars after formation of the seal. This strong tendency for sticking not only greatly decreased the speed that could be obtained in forming seals, but was, in connection with certain thermoplastic materials, so pronounced as to render the formation of satisfactory seals practically impossible. Thus, it was extremely difficult and in many cases almost impossible to obtain seals of satisfactory strength when sealing polyethylene, vinylidene chloride and certain other materials with conventional equipment. This difficulty greatly interfered with the practical introduction of these materials into the packaging industry although otherwise these materials possess the important advantages of attractive appearance, low cost, high mechanical strength and extremely low moisture transmission.

While the outlined difficulty of sticking is reduced to a readily tolerable degree by the use of the heatsealing machine and method disclosed in my aforesaid co-pending application, I have now discovered that the said machine and method can be further improved to the extent that any tendency of the thermoplastic sheet sticking to the heater element or strip is practically completely eliminated even when heatsealing such difficult materials as poylethylene or vinylidene chloride.

Broadly stated, according to the principles of the present invention, sticking of the sealed regions of the thermoplastic sheets to the surface of the heatsealing member constituted by an electrically conducting metal strip on a suitable insulative base is substantially eliminated by utilizing the substantial difference in the linear expansion of the metal strip or heater element and the sealed thermoplastic sheet materials in the temperature range between room temperature and heatsealing temperature.

In carrying the principles of the invention into practice, a pulse of an electric current is initiated through the heater element shortly before the said element is brought into pressure contact with the thermoplastic sheets. This will cause heating of the said element to or even slightly above heat-sealing temperature and a corresponding linear expansion of said element. In this preheated and slightly expanded condition the heater element is pressed against the region of the sheets to be heatsealed and the pulse of electric current flowing through the said heater element is continued for a heating period sufficient to cause heatsealing of the said region of the sheets. Pressure is maintained upon the said region after termination of the heating period to permit cooling and consolidation of the sealed region while still under pressure, whereupon the pressure is released. During this cooling and consolidating period the metal heater element will cool and contract at a slightly higher rate than the sealed region of the thermoplastic material and this difference in contraction is instrumental in effectively separating the adhering surface of the heater element from the sealed region of the thermoplastic sheets. In most cases little or no sticking is experienced when following the practice just outlined.

As a further refinement of the principles of the present invention, a second and shorter current pulse is passed through the heater element upon termination of the pressure on the sealed region of the sheets and concurrently with the initiation of the return displacement of the pressure members from their pressure-applying position into their open or rest position. The intensity and length of this second current pulse is so determined that it is sufficient to cause repeated slight heating and linear expansion of the heater element, both conditions being favorable to releasing or loosening the undesirable bond (sticking) that may still exist between the surfaces of the heater element and the heatsealed region of the sheets. However, the heating effect of the said second pulse of current is so determined as to be insufficient to cause appreciable reheating of the heatsealed region and possible weakening of the region already sealed. The outlined application of a second current pulse for further lessening or fully eliminating the undesirable sticking between the heater element and the heatsealed region of the sheets is particularly beneficial when the principles of the present invention are applied to fully automatic heatsealing and packaging machines where the individual heatsealing operations must follow each other in an extremely rapid sequence.

Referring now more particularly to Figures 1 and 2 of the drawing, a preferred embodiment of the principles of the invention into a heatsealing machine will be described. Reference numeral 10 generally denotes a movable pressure member or bar the upper portion 11 of which is formed of metal having a layer 12 of elastic insulating material cemented or otherwise bonded thereto constituting the operating or pressure-exerting face thereof. Layer 12 may be formed of any suitable elastomer capable of resisting to the effect of heatsealing temperatures without appreciable deterioration, such as natural or synthetic rubber, silicone rubber, tetrafluorethylene, or the like. Pressure member 10 is mounted for reciprocation by suitable displacing or reciprocating means, such means being diagrammatically indicated by a support 13 secured to metal plate or bar 11 by means of bolts 14.

The stationary heatsealing and pressure member or bar is generally denoted by reference numeral 15 and comprises a lower metal layer 16 and an upper layer 17 of an elastomer such as layer 12 of the upper bar 10. On the upper or operative surface of bar 15 is mounted a directly heated heater element 18 formed of strip or band of heatresisting metal, such as a suitable nickel-chromium alloy. As it will best appear in Fig. 2, the width of heater element or strip 18 is less than that of the pressure member and its thickness is quite low so that the heat capacity of the entire heater strip is likewise very low. Thus, good results are obtained with heater elements formed of a nickel-chromium alloy strip having a width of about ⅛ to ¼ inch and a thickness of about 0.0015" to 0.0035". It has been found that the heat capacity of such a strip is so low that its temperature will follow variations of the intensity of an electric current flowing therethrough with a negligible time lag.

The heater element or strip 18 is secured to the pressure member 15 by means of a pair of bolts 19 and nuts 20, the said bolts and nuts being insulated from metal layer 16 by means of suitable insulative bushings 21. It will be noted that both pressure members 10 and 15 are characterized by pressure-exerting surfaces of slightly elastic or compressible character assured by the provision of elastic layers 12 and 17, respectively. While the elastic layer 17 is not in direct contact with the materials or sheets to be sealed, its elasticity is effective to a limited extent through the heater element 18 mounted thereon as a result of the relatively flexible character of the said element. It has been found that such slightly elastic and conformable character of the operative surfaces of both pressure members is quite beneficial when heatsealing articles the thickness of which is not uniform throughout their transverse dimension, such being the case, for example, with gusseted bags.

A thin layer of insulating material 22 may be provided on top of the heater element 18. This layer may be constituted of an oxide layer on the heater element or may be formed of an independent and very thin layer of tetrafluorethylene cemented or otherwise secured thereto.

The ends of the heater element 18 are directly connected to the ends of the secondary winding 23 of a step-down transformer 24 through bolts 19. The primary winding 25 of transformer 24 is energized from a source of alternating current 26 when either one of the relay contacts 27 or 28 is closed. The intensity of the current flowing through the primary winding 25 may be adjusted by power rheostats 29 and 30, respectively connected in series with relay contacts 27 and 28.

Source 26 is in most cases represented by the commercial alternating current power line having a voltage in the order of 110 volts and a frequency of 60 cycles. The step-down transformer 24 is so designed as to apply voltages in the order of 6-20 volts and currents in the order of 5-50 amperes to the heater element upon the primary winding of the said transformer being energized.

A control mechanism is provided to coordinate the energization of the heater element with the pressure-applying or pressure-releasing relative displacement of the pressure members 10 and 15. Since it is desirable to operate the said mechanism by direct current, a portion of the alternating voltage available between conductors 31 and 32 is rectified by a dry rectifier 33, the rectified or direct current voltage being made available between positive and negative conductors 34 and 35, respectively, which are connected to the respective terminals of a filter condenser 36 of large capacity.

The control mechanism comprises two independent timing circuits A and B, the first one of which controls energization of the heater element during the pressure-applying relative displacement of the pressure members 10 and 15, while the second one controls energization of the said heater element during the pressure-releasing relative displacement of the said pressure members.

The first timing circuit A comprises a switch 37 including stationary contacts 38 and 39 and a contact spring 40, biased to be normally in pressure engagement with contact 38. A timer condenser 41 of suitable capacity, such as 1–2 microfarads, is connected between contact spring 40 and negative conductor 35. Rest contact 38 is connected to positive conductor 34, and working contact 39 is connected through a variable resistance 42 in the order of 100,000 to 5,000,000 ohms and through coil winding 43 of a sensitive relay to negative conductor 35.

Switch 37 is operable by an inverted L-shaped actuating rod 44, the upper horizontally extending end of which is fixed in pressure member 10 and the downwardly extending end of which carries a screw 45 adjustably inserted therein. The head of the said screw is engageable with insulative member 46 mounted on the free end of contact spring 40 during downward or pressure-exerting displacement of pressure member 10. The exact time of engagement of insulator 46 and thus that of the actuation of switch 37 is adjustable within wide limits by turning screw 45 in the lower end of actuating rod 44 so that the said screw protrudes to a varying extent from the end of the rod.

The second timing circuit B is closely similar to the one just described and comprises a switch 47 including stationary contacts 48 and 49 and a contact spring 50, biased to be normally in pressure engagement with contact 48. A timer condenser 51 of suitable capacity, such as 1–2 microfarads, is connected between contact spring 50 and negative conductor 35 through a normally closed on-off switch 57. Rest contact 48 is connected through a variable resistance 52 in the order of 100,000 to 5,000,000 ohms and through coil winding 53 of a sensitive relay to negative conductor 35 and working contact 49 is directly connected to positive conductor 34.

Switch 47 is operable by an inverted L-shaped actuating rod 54, the upper horizontally extending end of which is fixed in pressure member 10 and the downwardly extending end of which carries a screw 55 adjustably inserted therein. The head of said screw is engageable with insulative member 56 mounted on the free end of contact spring 50 during downward or pressure-exerting engagement of pressure member 10. The exact time of engagement of insulator 56 and thus that of the actuation of switch 47 is adjustable within wide limits by turning screw 55 in the lower end of actuating rod 54 so that the said screw protrudes to a varying extent from the end of the rod.

From the foregoing description, the operation of the heatsealing machine of the invention will be readily understood by those skilled in the art. When it is desired to heatseal thermoplastic sheets or layers, the regions of the layers 58 and 59 to be heatsealed are brought into face-to-face position, as shown in Figs. 1 and 3. Thereafter, pressure members 10 and 15 are displaced with respect to each other by the reciprocating means in order to bring them into co-operating position in which the regions of the layers to be heatsealed are compressed between the exposed surfaces of layer 12 of pressure member 10 and of the heater element 18 on pressure member 15. It will be noted that in the normal condition of rest of the machine, condenser 41 is charged to the voltage of the direct current source due to the fact that one of the terminals of the said condenser is directly connected to negative conductor 35, while the other terminal of the said condenser is connected to positive conductor 34 through the normally closed contacts 38 and 40 of switch 37.

Sometime during the downward displacement of pressure member 10, the head of screw 45 will strike against insulator 46 of switch 37 and will actuate the said switch, breaking contact between contacts 38 and 40 and making contact between contacts 40 and 39. This will connect the charged condenser to the winding 43 of the relay since one terminal of the said condenser is directly connected to one end of the said winding while the other terminal of the said condenser will be connected to the other end of said winding through closed contacts 40 and 39 and variable resistance 42. The condenser will start discharging through the relay winding which now being energized will close relay contacts 27 and will connect primary winding 25 of transformer 24 to alternating current source 26 through rheostat 29. Upon the circuit of the primary winding 25 being closed, an alternating current of low voltage and high intensity is passed through heater element 18, practically instantaneously heating the said element to heatsealing temperatures. The resultant heat is transferred by surface contact to the regions of the thermoplastic layers compressed between the pressure members causing heatsealing thereof.

A predetermined period thereafter, the charge of condenser 41 will be dissipated in the closed circuit including variable resistance 42 and relay winding 43 so that the relay will be deenergized, opening contact 27, which will break the primary circuit of transformer 24, thereby discontinuing the generation of sealing heat in heater element 18.

Timing circuit A of the machine, just described, permits accurate adjustment and control of the following operating conditions:

1. The length of the heating period. This is determined by the capacity of condenser 41, the value of resistance 42, the resistance of winding 43 of the relay and the value of the direct current voltage available between conductors 34 and 35. The duration of the heating period is conveniently adjustable by adjusting any one of these factors, preferably by adjusting the variable resistance 42.

2. The phase difference, if any, between the heating period and the period of pressure application to the regions of the layers to be heatsealed. This may be adjusted, for example, by rotational adjustment of screw 45. The more the said screw extends from rod 44, the sooner switch 37 will be actuated during downward displacement of pressure member 10.

3. The amount of heating current that is passed through the heater element 18 during the unit of time. This may be adjusted by means of rheostat 29 which is in series with lead 31 of the source of alternating current 26 and with primary winding 25 of transformer 24.

In accordance with the principles of the present invention, the above operating conditions are so adjusted that the heating period of heater element 18 begins a short time before pressure is applied upon the layers to be heatsealed. This makes it possible to have the heater element preheated and slightly expanded before it is pressed against the heatsealing regions of the layers. Also, the duration of the heating period is so determined that it ends before the period of compression so that the heatsealed regions of the layers are allowed to cool and consolidate under pressure. As it has been set forth in the foregoing, under these conditions the strength of the seal is the maximum and the sticking of the sealed regions to the heater element is the minimum.

The most suitable length of the heating period and the amount of heating current applied to the heater element throughout such period depend on various factors, such as the material and the thickness of the thermoplastic layers, the number of layers to be heatsealed together, the presence or absence of any non-fusible layers and their physical characteristics, etc. In general, within certain practical limits, shortening of the heating period can be compensated for by increasing the current passed through the primary winding of the transformer by appropriate setting of rheostat 29. Practical operating experience has proved that entirely satisfactory seals of most commercial thermoplastic films may be obtained with heating cycles considerably shorter than one second.

Figure 4 is a perspective view of thermoplastic layers 58 and 59 after the heatsealing operation. It will be noted that after heatsealing the boundary surface between the two layers will completely disappear in the heatsealing region 60 in which the said layers will be integrally fused together so that their strength in the said region will at least equal and in most cases exceed the strength of the unsealed layers.

In some cases, particularly when the heatsealing device of the invention constitutes part of an automatic packaging machine in which it is desired to obtain the highest operating speeds, it is advantageous to pass another short pulse of heating current through the heater element at the time when the pressure members 10 and 15 separate from each other upon completion of a sealing cycle. This will further reduce or will completely eliminate any remaining tendency of the just-sealed layers to stick to the surface of the heater element.

Timing circuit B is provided for applying said second heating pulse of the proper intensity and duration to the heater element and in the proper phase with respect to the return or pressure-releasing displacement of the pressure members 10 and 15.

During the pressure-applying (downward) displacement of pressure member 10, screw 55 at the end of rod 54 will strike against insulator 56 on spring 50 of switch 47. Condenser 51 will be charged due to the fact that one of its terminals is connected to negative conductor 35 through normally closed switch 57 and its other terminal is connected to positive conductor 34 through the closed contacts 49 and 50 of switch 47. The condenser will remain in this charged condition throughout the pressure applying period.

As soon as pressure member 10 is displaced upwards and thus the pressure applied to the sealed regions of layers 58, 59 is released, contacts 49 and 50 of switch 47 are separated and contacts 48 and 50 are closed. Condenser 51 will be connected in a closed circuit comprising closed contacts 48, 50, variable resistance 52, relay winding 53 and normally closed switch 57, through which the condenser will begin to discharge. Relay winding 53 will be energized and will close its contacts 28 which will connect primary winding 25 of transformer 24 to alternating current source 26 through rheostat 30. Heater element 18 is energized for a second heating period the duration of which is determined by the time required by condenser 51 to have its charge dissipated in relay winding 53 and resistance 52.

In view of the close similarity of timing circuit B to timing circuit A, it will not be necessary to fully repeat the description of its operation. It will be sufficient to state that the length of the second heating period may be conveniently adjusted by adjusting resistance 52 while the intensity of the current passed through the heater element 18 may be conveniently adjusted by rheostat 30. The time upon which the second heating pulse is initiated is adjusted by rotation of screw 55 at the end of rod 54 which determines the time when the said screw will release switch 47 upon upward or return displacement of pressure member 10.

Preferably, the second heating pulse is initiated as soon as pressure member 10 starts its return displacement. The duration and intensity of the said pulse are so determined that the resulting heating effect is merely sufficient to loosen the bond or superficial adherence (sticking) between the sealed region of the thermoplastic layers and the surface of the heater element 18 but is insufficient to appreciably heat the weld itself which might cause weakening of the seal.

When sealing thermoplastic materials having no excessive tendency to sticking or when it is not necessary to obtain maximum operating speeds, the timing circuit B may be disabled by opening switch 57. This will eliminate application of the second heating pulse to the heater element.

Although the present invention has been disclosed in connection with a preferred embodiment thereof, variations and modifications may be resorted to by those skilled in the art without departing from the principles of the present invention. I consider all of these variations and modifications to be within the true spirit and scope of the present invention, as disclosed in the foregoing description and defined by the appended claims.

What is claimed is:

1. The method of heatsealing layers of thermoplastic material which comprises bringing the regions of the layers to be heatsealed into face to face position, compressing said regions between a pair of normally cool pressure surfaces at least one of which is electrically conducting, passing an electric current along said conducting surface for a predetermined period to rapidly increase its temperature and to cause heatwelding of the regions of the layers in contact therewith, maintaining compression upon said regions after termination of said period until the said conducting surface has cooled and the weld formed in the heatsealing regions has consolidated, and then passing an electric current along said conducting surface for a second predetermined period to facilitate separation of the heatsealed regions from said surface.

2. The method of heatsealing thermoplastic sheets which comprises compressing the regions of the sheets to be heatsealed between a pair of surfaces at least one of which is constituted by an electrically conducting layer, passing an electric current through said conducting layer for a predetermined period to increase its temperature to heat-sealing temperature, the resultant heat being transferred by surface contact to said regions of the sheets causing heatsealing thereof, maintaining compression upon said regions after termination of said period until said conducting layer has cooled and the weld formed in the heatsealing region has been consolidated, and then passing an electric current through said conducting layer for a second predetermined period, the heating effect of said last-named current being so determined as to be insufficient to cause weakening of the said weld but being sufficient to facilitate separation of the heatsealed regions from the surface of said conducting layer.

3. The method of heatsealing thermoplastic layers which comprises compressing the regions of the layers to be heatsealed between an electrically conducting surface and another surface, passing an electric current along said conducting surface for a predetermined period to increase its temperature to heatsealing temperature, the resultant heat being transferred by surface contact to said regions of the layers and causing heatsealing thereof, maintaining compression upon said regions after termination of said period until said conducting layer has cooled and the weld formed in the heatsealing region has been consolidated, thereupon terminating said compression, and then passing an electric current along said conducting surface for a second predetermined period to heat said surface to an extent sufficient to facilitate release of the said heatsealed regions substantially without heating of the weld already formed.

4. The method of heatsealing thermoplastic sheets which comprises compressing the regions of the sheets to be heatsealed between a pair of surfaces one of which is constituted by an electrically conducting layer, passing an electric current through said conducting layer for a predetermined period to increase its temperature to heatsealing temperature, the resultant heat being transferred by surface contact to said regions of the sheets causing heatsealing thereof, maintaining compression upon said regions after termination of said period until said conducting layer has cooled and the weld formed in the heatsealing regions has been consolidated, then passing an electric current through said conducting layer for a second predetermined period, and so adjusting the intensity and the period of passage of said current that its heating effect will loosen the bond between the said heatsealed regions and the surface of said conducting layer without appreciable heating effect upon the weld already formed between the thermoplastic sheets.

5. The method of heatsealing layers of thermoplastic material which comprises bringing the regions of the layers to be heatsealed into face to face position, interposing said regions between a pair of normally cool pressure surfaces at least one of which is electrically conducting, displacing said surfaces toward one another to apply compression on said regions of the layers, passing an electric current along said conducting surface for a predetermined period to rapidly increase its temperature and to cause heatwelding of the regions of the layers in contact therewith, said period beginning prior to the application of compression, maintaining compression upon said regions after termination of said period until the said conducting surface has cooled and the weld formed in the heatsealed regions has been consolidated, thereupon terminating said compression, and then passing an electric current along said conducting surface for a second predetermined period to heat said surface to an extent sufficient to facilitate release of the said heatsealed regions substantially without heating of the weld already formed.

6. The method of heatsealing sheets of thermoplastic material which comprises compressing for a first predetermined period the regions of the sheets to be heatsealed between a pair of surfaces at least one of which is constituted by an electrically conducting layer, passing for a second predetermined period an electric current through said conducting layer to rapidly increase its temperature, said second period beginning before the beginning of the said first period and terminating before termination of the said first period whereby said regions of the sheets will be heatsealed during the overlapping portions of said first and second periods and the weld formed in said regions will cool and consolidate under pressure during the portion of the first period extending beyond termination of the second period, and then passing an electric current through said conducting layer for a third predetermined period beginning after termination of said first period to facilitate release of the heatsealed regions from the surface of the conducting layer.

NICHOLAS LANGER.

REFERENCES CITED

The following references are of record in the file of this patent:

UNITED STATES PATENTS

| Number | Name | Date |
|---|---|---|
| 1,806,846 | Fox | May 26, 1931 |
| 2,241,312 | Luty | May 6, 1941 |
| 2,393,100 | Gallay | Jan. 15, 1946 |
| 2,410,834 | Messmer | Nov. 12, 1946 |
| 2,441,817 | Huff | May 18, 1948 |
| 2,460,460 | Langer | Feb. 1, 1949 |
| 2,466,735 | Piazze | Apr. 12, 1949 |
| 2,469,972 | Lowry | May 10, 1949 |
| 2,479,375 | Langer | Aug. 16, 1949 |

OTHER REFERENCES

Doughboy, published by the Dairyland Farmer Press, New Richmond, Wisconsin, received in the Patent Office, December 9, 1946.